US012139964B2

(12) United States Patent
Gayhart

(10) Patent No.: US 12,139,964 B2
(45) Date of Patent: Nov. 12, 2024

(54) SLIDING SECURITY DOOR SYSTEM

(71) Applicant: Summit Safety Closer, Inc., Union Grove, WI (US)

(72) Inventor: Gary Gayhart, Racine, WI (US)

(73) Assignee: Summit Safety Closer, Inc., Union Grove, WI (US)

( * ) Notice: Subject to any disclaimer, the term of this patent is extended or adjusted under 35 U.S.C. 154(b) by 76 days.

(21) Appl. No.: 18/185,037

(22) Filed: Mar. 16, 2023

(65) Prior Publication Data

US 2023/0295981 A1 Sep. 21, 2023

Related U.S. Application Data

(60) Provisional application No. 63/320,555, filed on Mar. 16, 2022.

(51) Int. Cl.

*E06B 5/10* (2006.01)
*E05B 17/00* (2006.01)
*E05F 15/48* (2015.01)
*E05F 15/635* (2015.01)

(52) U.S. Cl.

CPC ............ *E06B 5/10* (2013.01); *E05B 17/0029* (2013.01); *E05F 15/48* (2015.01); *E05F 15/635* (2015.01)

(58) Field of Classification Search

CPC .......... E06B 5/10; E05F 15/60; E05F 15/603; E05F 15/632; E05F 15/635; E05F 17/001; E05B 83/40; E05B 83/363; E05B 17/0029; E05B 65/0017; E05B 65/0882

See application file for complete search history.

(56) References Cited

U.S. PATENT DOCUMENTS

| | | | | | |
|---|---|---|---|---|---|
| 1,917,415 | A * | 7/1933 | Woodruff | F16L 59/04 | 49/362 |
| 1,997,175 | A * | 4/1935 | Gussack | B66B 13/08 | 16/93 R |
| 2,287,422 | A * | 6/1942 | Field | E05F 17/001 | 340/545.9 |
| 4,091,570 | A * | 5/1978 | Favrel | E05F 15/652 | 49/362 |
| 4,897,959 | A * | 2/1990 | Worden | E05F 15/632 | 49/358 |
| 5,241,787 | A * | 9/1993 | Norman | E05B 65/0017 | 49/449 |
| 5,638,639 | A * | 6/1997 | Goodman | E05C 19/001 | 49/7 |
| 5,836,424 | A * | 11/1998 | Allen | B66B 13/30 | 49/120 |
| 6,585,303 | B1 * | 7/2003 | Coose | E05F 15/635 | 292/144 |
| 7,350,332 | B2 * | 4/2008 | Petridis | E05F 15/635 | 49/122 |

(Continued)

*Primary Examiner* — Justin B Rephann

(74) *Attorney, Agent, or Firm* — Christopher M. Scherer; DeWitt LLP

(57) ABSTRACT

The present sliding security door system includes a sliding security door extending between an upper track and a lower track. Separate motive and locking assemblies drive and secure the door, respectively. A control assembly in the system is capable of separately activating motive and locking effectors to allow for separate movement and locking/unlocking of the door. Because of this, the system is compact and capable of deployment in otherwise too-small spaces.

18 Claims, 17 Drawing Sheets

(56) References Cited

U.S. PATENT DOCUMENTS

| | | | | |
|---|---|---|---|---|
| 8,959,836 | B2 * | 2/2015 | Gayhart | E06B 3/4654 49/141 |
| 8,978,301 | B2 * | 3/2015 | Ueda | E05B 81/13 292/201 |
| 10,328,955 | B2 * | 6/2019 | Yamaguchi | B61D 19/005 |
| 10,494,852 | B2 * | 12/2019 | Fujita | B61D 19/026 |
| 11,225,816 | B2 * | 1/2022 | Gayhart | E05F 15/635 |
| 11,519,219 | B2 * | 12/2022 | Everett | E06B 3/4654 |
| 11,993,977 | B2 * | 5/2024 | Glover | E06B 1/325 |
| 2010/0188177 | A1 * | 7/2010 | Inage | E05B 65/0882 335/205 |
| 2011/0308164 | A1 * | 12/2011 | Terasaki | E05B 83/02 49/360 |
| 2012/0060419 | A1 * | 3/2012 | Riggs | E05B 65/0876 49/449 |
| 2012/0255232 | A1 * | 10/2012 | Gayhart | E05B 65/0017 49/360 |
| 2013/0340346 | A1 * | 12/2013 | Ueda | E05B 83/40 49/280 |
| 2014/0366449 | A1 * | 12/2014 | Masuda | E05B 83/42 49/281 |
| 2015/0054294 | A1 * | 2/2015 | Uno | E05B 81/38 292/194 |
| 2018/0266172 | A1 * | 9/2018 | Wray | E05F 17/004 |
| 2019/0218848 | A1 * | 7/2019 | Fujita | B61D 19/02 |
| 2019/0242175 | A1 * | 8/2019 | Fujita | B61D 19/00 |
| 2021/0047880 | A1 * | 2/2021 | Gosling | E06B 7/2309 |
| 2021/0156184 | A1 * | 5/2021 | Gayhart | E05B 65/108 |
| 2022/0389757 | A1 * | 12/2022 | Glover | E06B 7/16 |

* cited by examiner

FIG. 1G
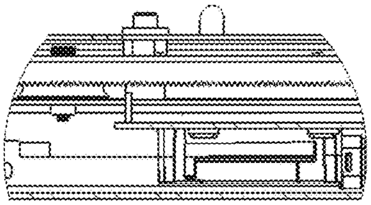
FIG. 1F
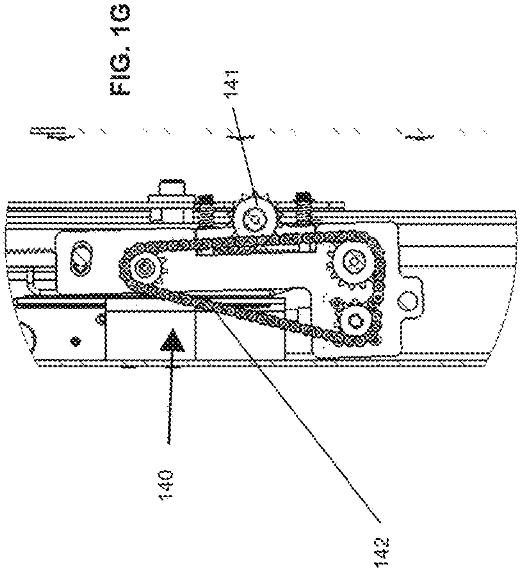
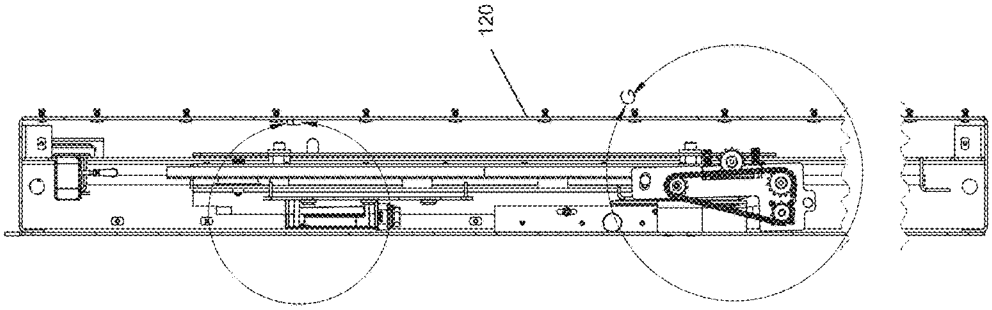
FIG. 1D
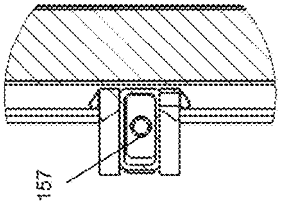
FIG. 1E
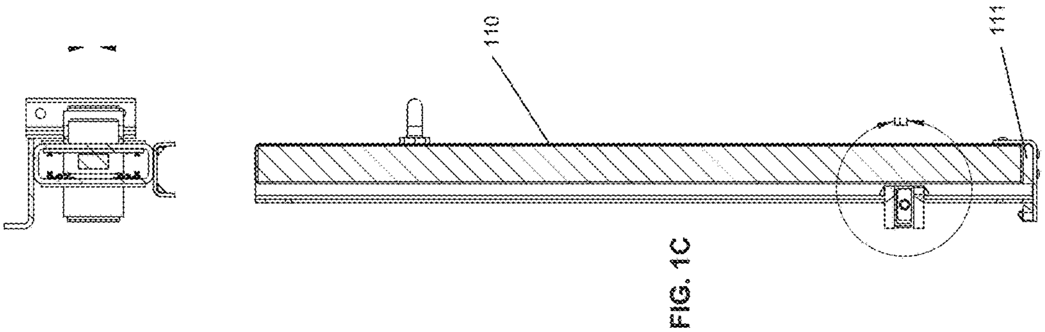
FIG. 1C

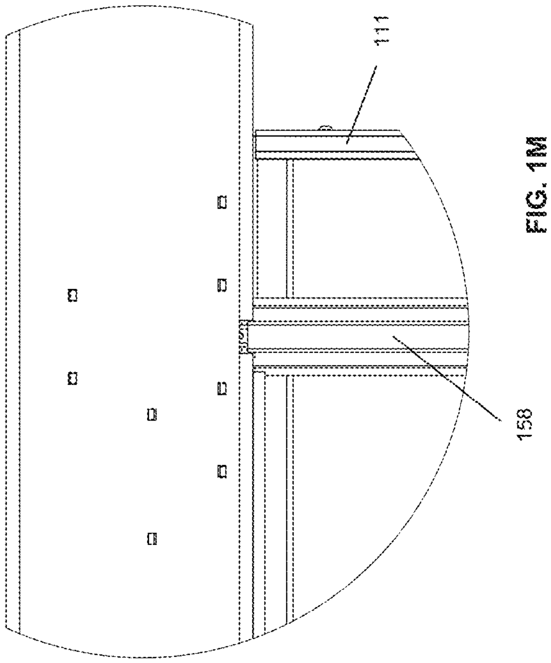
FIG. 1M
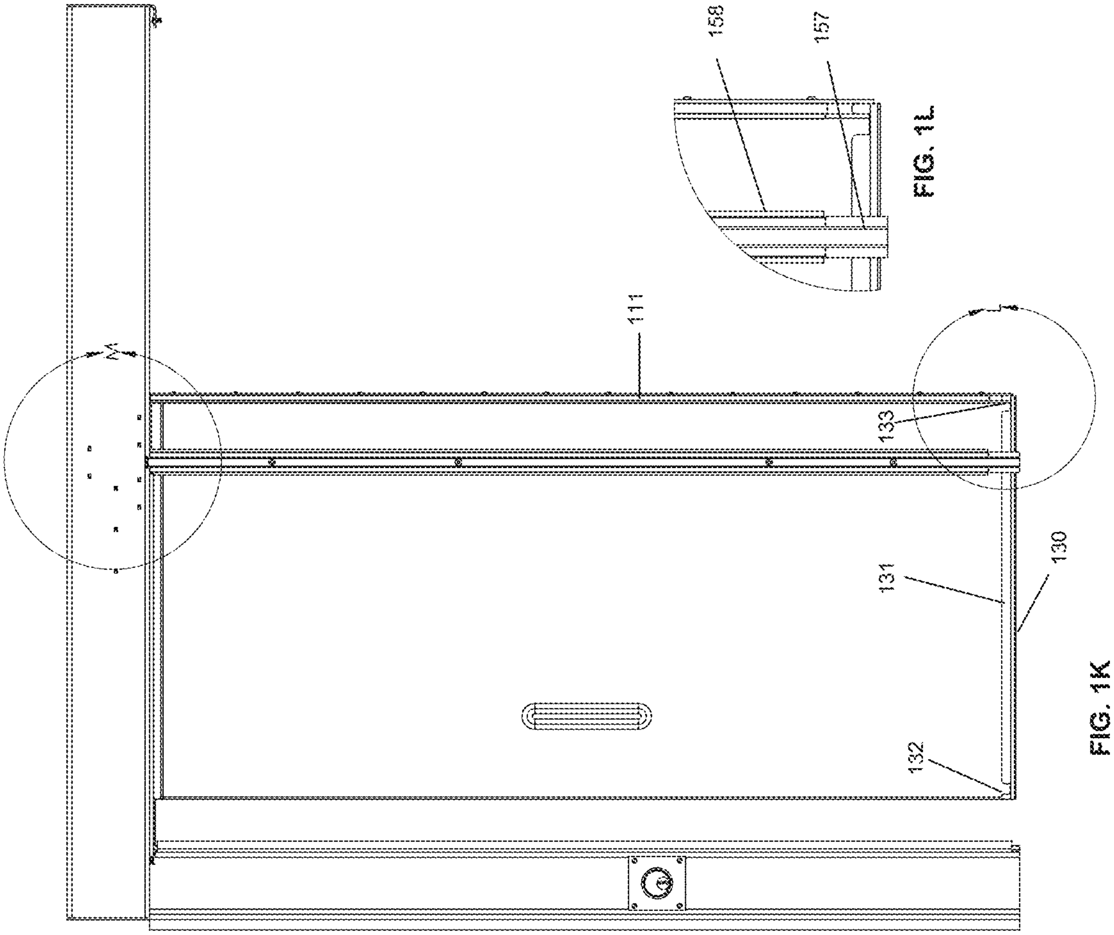
FIG. 1L
FIG. 1K

FIG. 5E
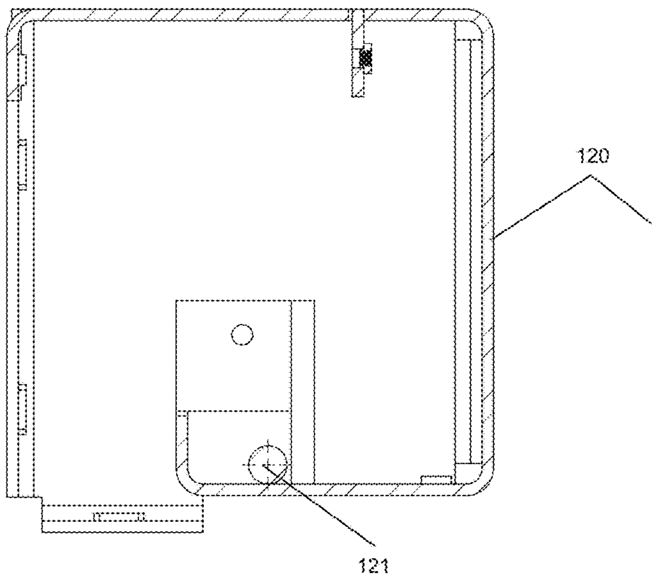
FIG. 5F
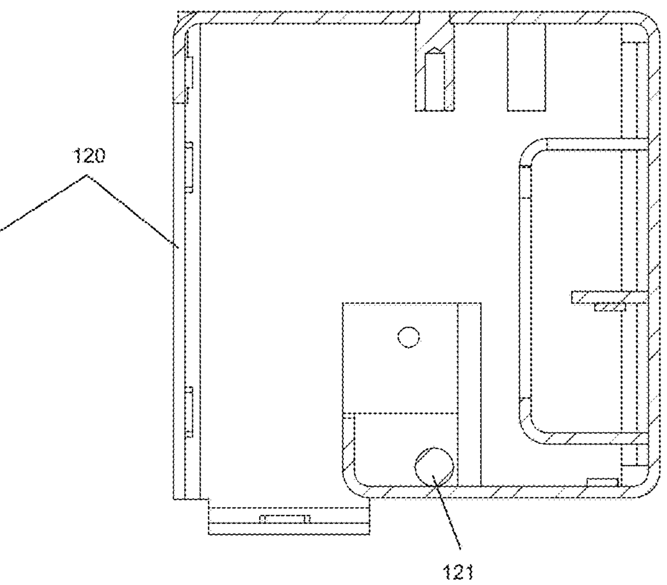
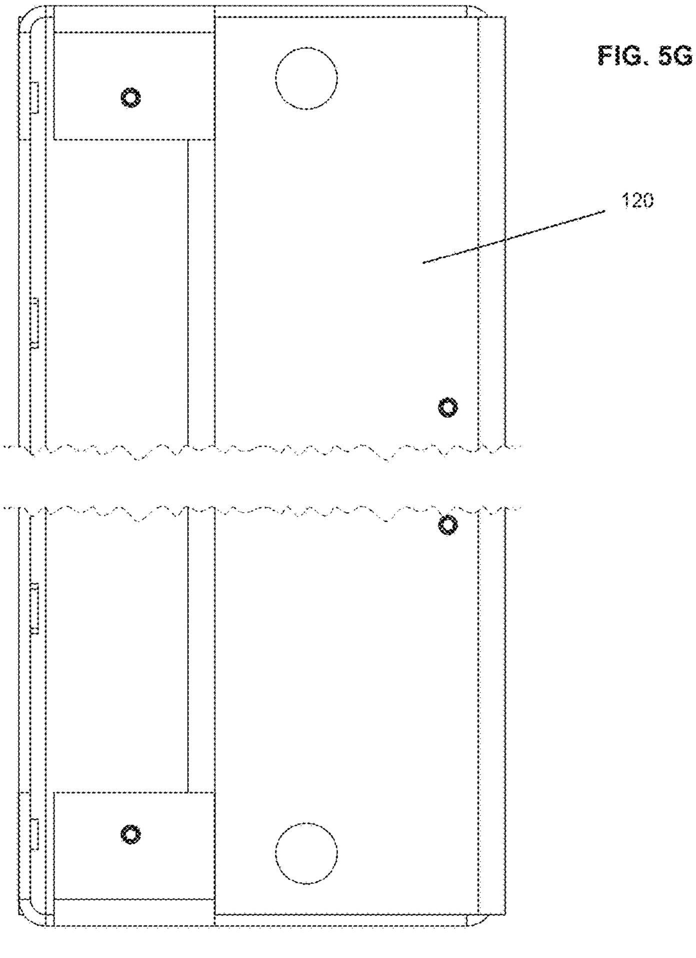
FIG. 5G
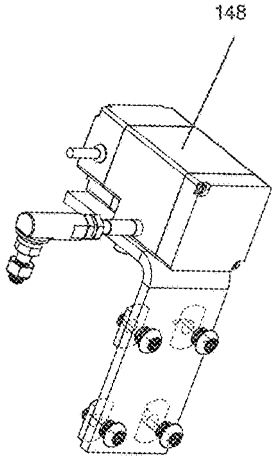
FIG. 6

153
154
155
159
150

153
154

153
154
155
159
160

154
155

SLIDING SECURITY DOOR SYSTEM

CROSS-REFERENCE TO RELATED APPLICATIONS

This application claims the benefit of prior-filed, U.S. Provisional Patent Application No. 63/320,555, filed on Mar. 16, 2022, the contents of which are incorporated herein by reference in their entirety.

BACKGROUND OF THE INVENTION

The present disclosure is directed to a sliding door system, and more specifically to a sliding high-security door system.

High-security door systems which allow a security door to slide between an open and a closed position are well known in the art. Such systems are commonly used in detention facilities, military installations, and other high-security structures. These systems incorporate operators to open and close the security doors. Such corridor sliding-door operators must be operable from remote locations to provide for egress in an emergency.

Detention facilities require a sliding-door operator for detention cells, while building codes list safety requirements for corridors and power-driven door operators. Numerous facilities are replacing manually operated sliding cell doors with security door systems incorporating power-driven door operators, or upgrading older power-driven operators. Successful replacement requires that the door operators have a height of no more than eight inches (8") and an operating overrun of no more than $1\frac{3}{16}$" to allow for fitting in narrow width cells. However, because previous door operators require that the same operator is responsible for both door movement and door unlocking, they require unacceptably high and broad dimensions of the associated system. Furthermore, the structure of the door operators must be reconfigured for every differing door width.

There is an unmet need in the art for a robust, remote-operated power-driven door operator which has a very short overrun and can be used in limited space locations.

BRIEF SUMMARY

In one general aspect, according to certain embodiments a sliding security door system is disclosed that includes a door extending between an upper track and a lower track. A motive assembly is located in the upper track for driving a carriage assembly connected to the door. The motive assembly includes a motive effector operably connected to a rack connected to a carriage. A locking assembly is at least partially located in the upper track for preventing movement of the door. The locking assembly includes a locking effector operably connected to a locking bar. A control assembly is operably connected to the motive assembly and the locking assembly. The control assembly is capable of separately activating the motive effector and the locking effector.

BRIEF DESCRIPTION OF THE DRAWING(S)

Figure 1A:
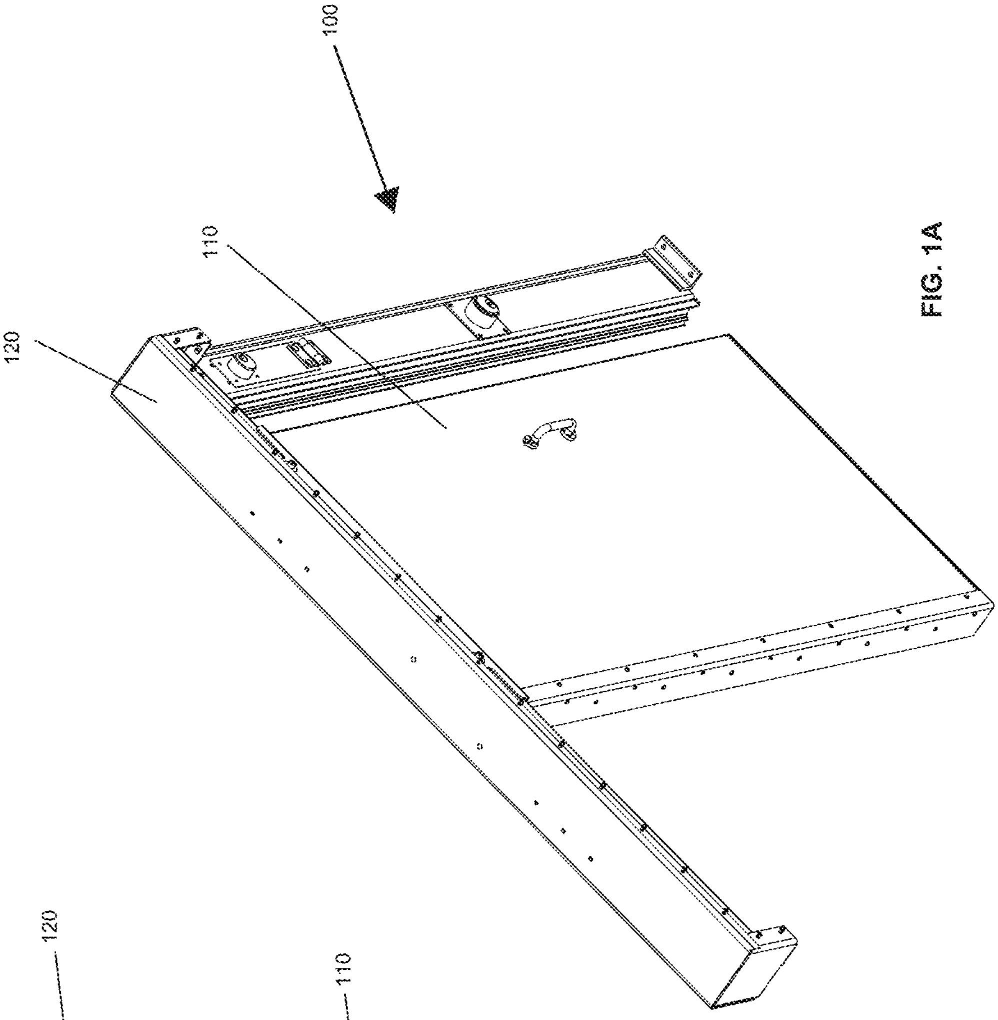
FIGS. 1A and 1B depict perspective and side views, respectively, of an example embodiment of a sliding security door system according to certain embodiments.
Figure 1B:
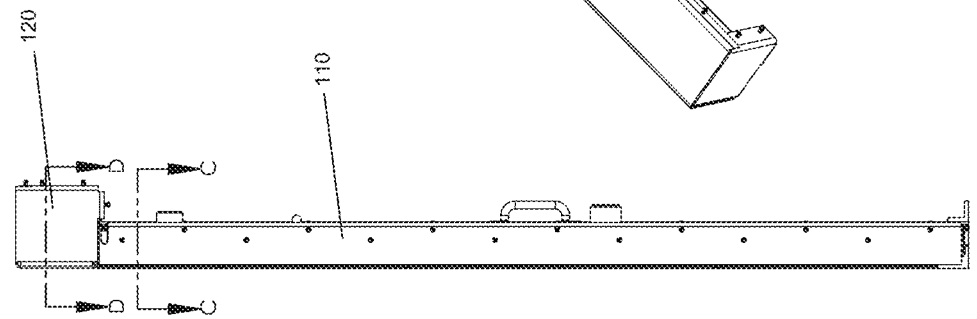
Figure 1I:
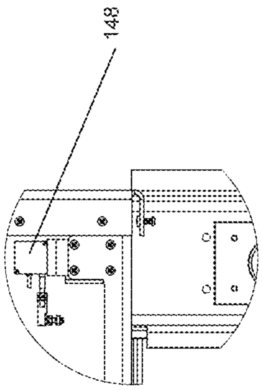
FIGS. 1C and 1D depict cross-sectional views of the system taken along the C-C and D-D planes, respectively, of FIG. 1B.
FIG. 1E depicts a partial magnified view of the system taken from FIG. 1C.
FIGS. 1F and 1G depict partial magnified views of the system taken from FIG. 1D.
FIG. 1H depicts a front view of the system.
FIGS. 11 and 1J depict partial magnified views of the system taken from FIG. 1H.
FIG. 1K depicts a rear view of the system.
FIGS. 1L and 1M depict partial magnified views of the system taken from FIG. 1K.
Figure 1J:
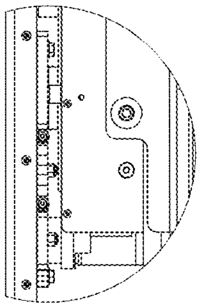
Figure 1H:
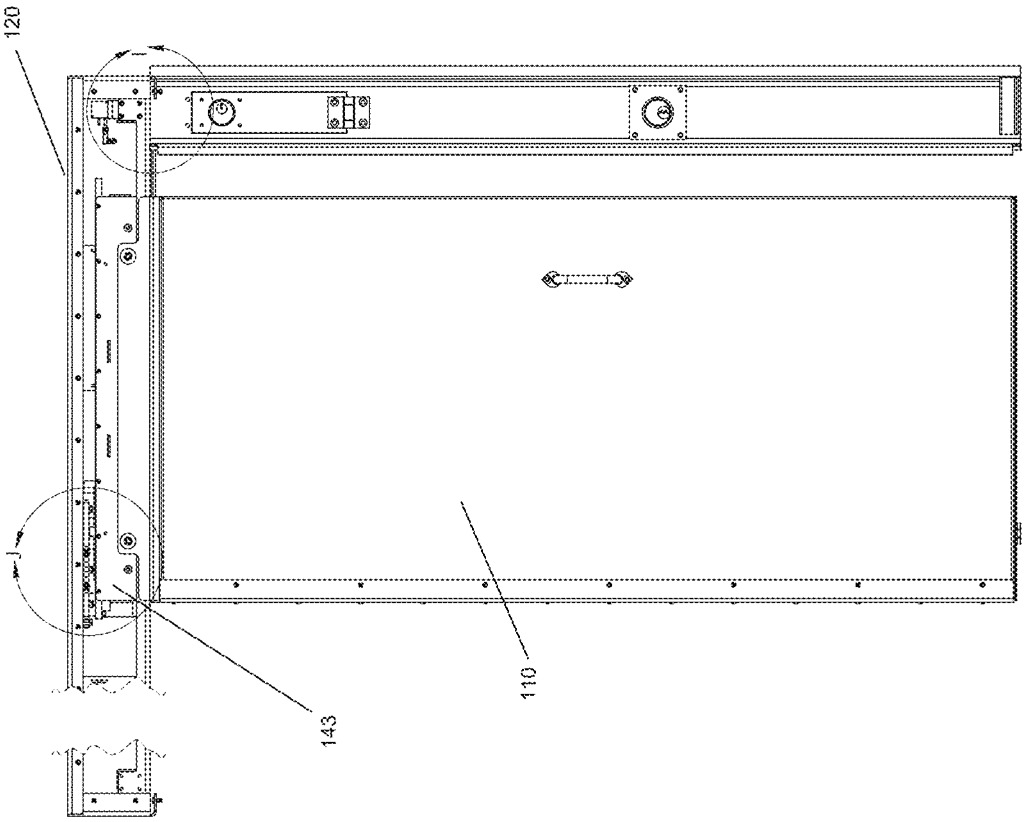
Figures 2A, 2B, 2C:
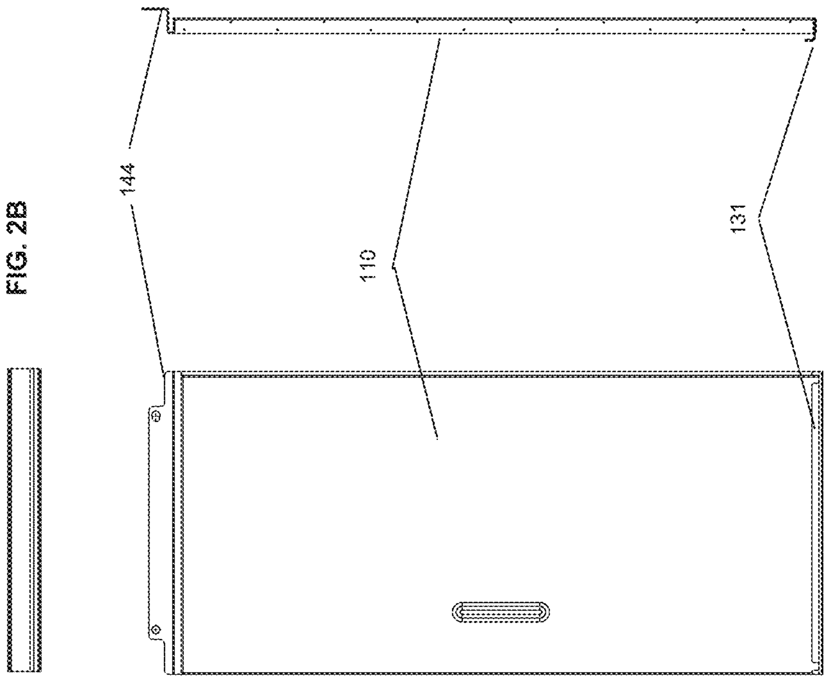

FIGS. 2A, 2B, and 2C depict rear, top, and side views, respectively, of an example embodiment of a door according to certain embodiments.

FIGS. 3A, 3B, 3C, and 3D depict front, top, side, and perspective views, respectively, of an example embodiment of a door and motive assembly according to certain embodiments.

Figure 3D:
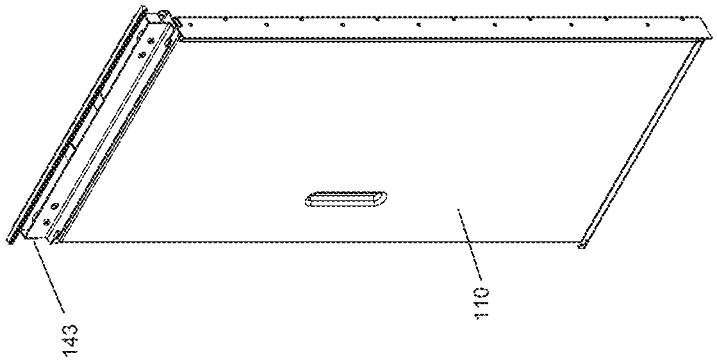
Figure 3C:
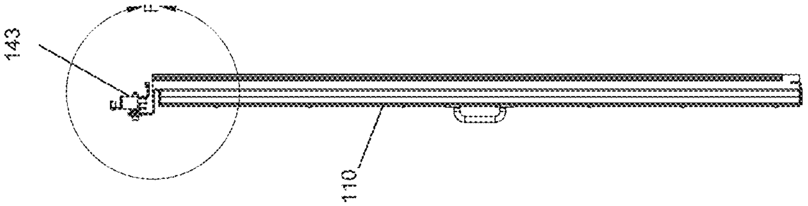
Figure 3E:
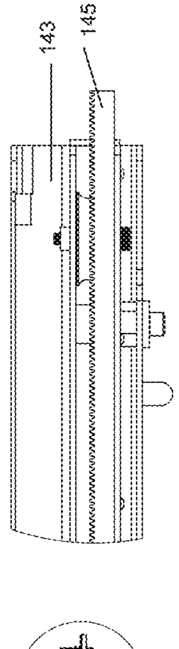
Figure 3F:
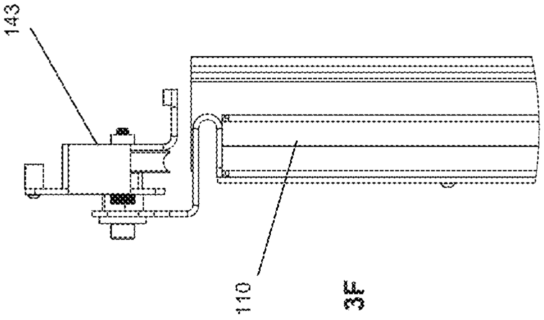
Figure 3B:
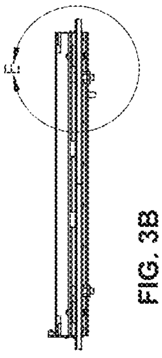
Figure 3A:
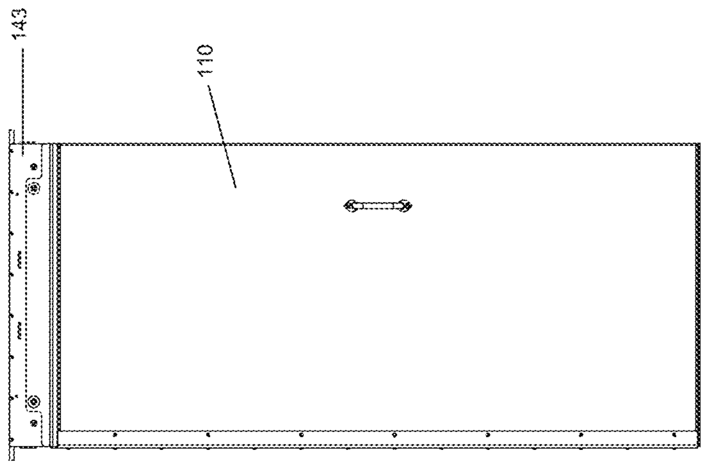

FIGS. 3E and 3F depict partial magnified views of the door and motive assembly taken from FIGS. 3B and 3C, respectively.

Figure 4A:
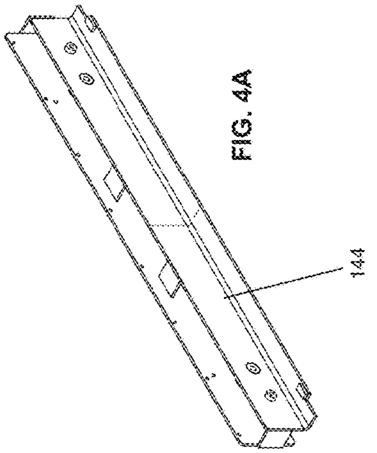
Figure 4C:
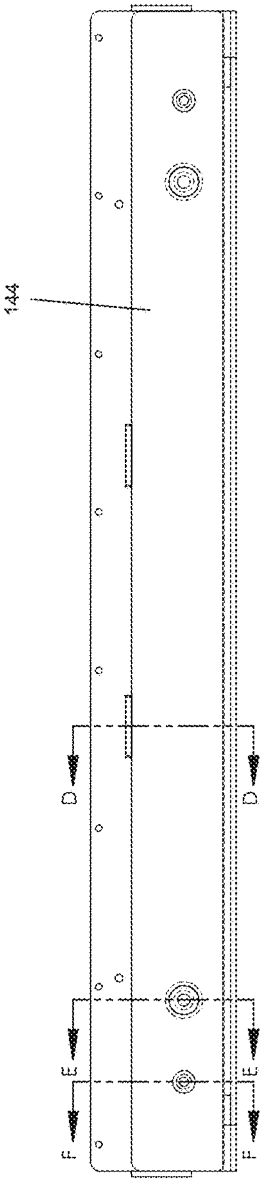
Figure 4D:
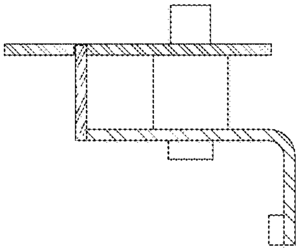
Figure 4E:
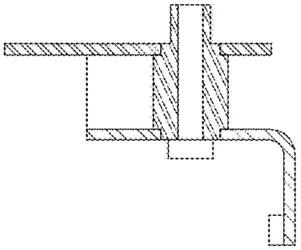
Figure 4F:
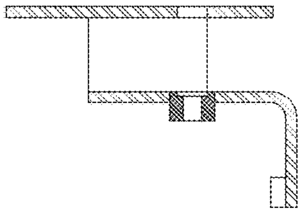
Figure 4B:
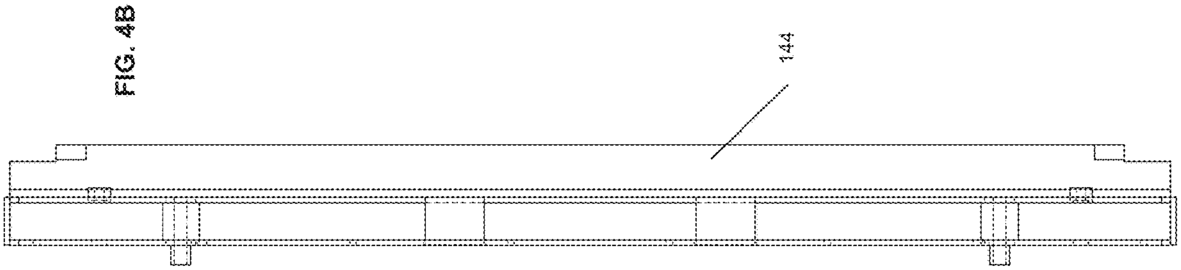

FIGS. 4A, 4B, and 4C depict front, top, and perspective views, respectively, of an example embodiment of a door and carriage assembly according to certain embodiments.

FIGS. 4D, 4E, and 4F depict cross-sectional views of the door and carriage assembly taken along the D-D, E-E, and F-F planes, respectively, of FIG. 4C.

FIGS. 5A, 5B, 5C, and 5G depict perspective, front, top, and collapsed views, respectively, of an example embodiment of an upper track according to certain embodiments.

Figures 5A, 5B, 5C, 5D:
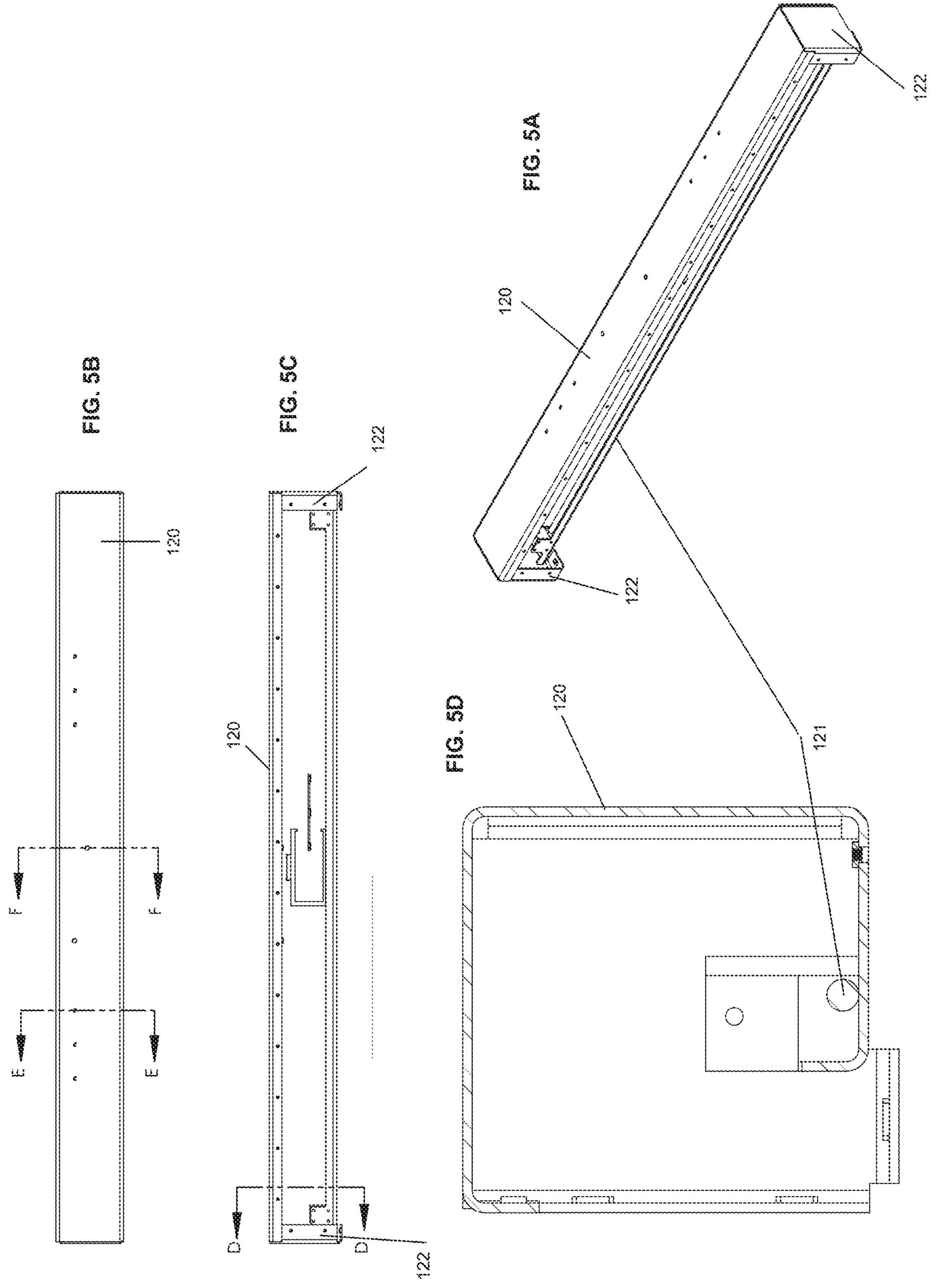

FIGS. 5D, 5E, and 5F depict cross-sectional views of the door and carriage assembly taken along the D-D, E-E, and F-F planes, respectively, of FIGS. 5B and 5C.

FIG. 6 depicts a perspective view of an example embodiment of a carriage sensor according to certain embodiments.

Figures 7A, 7B, 7C, 7D, 7E:
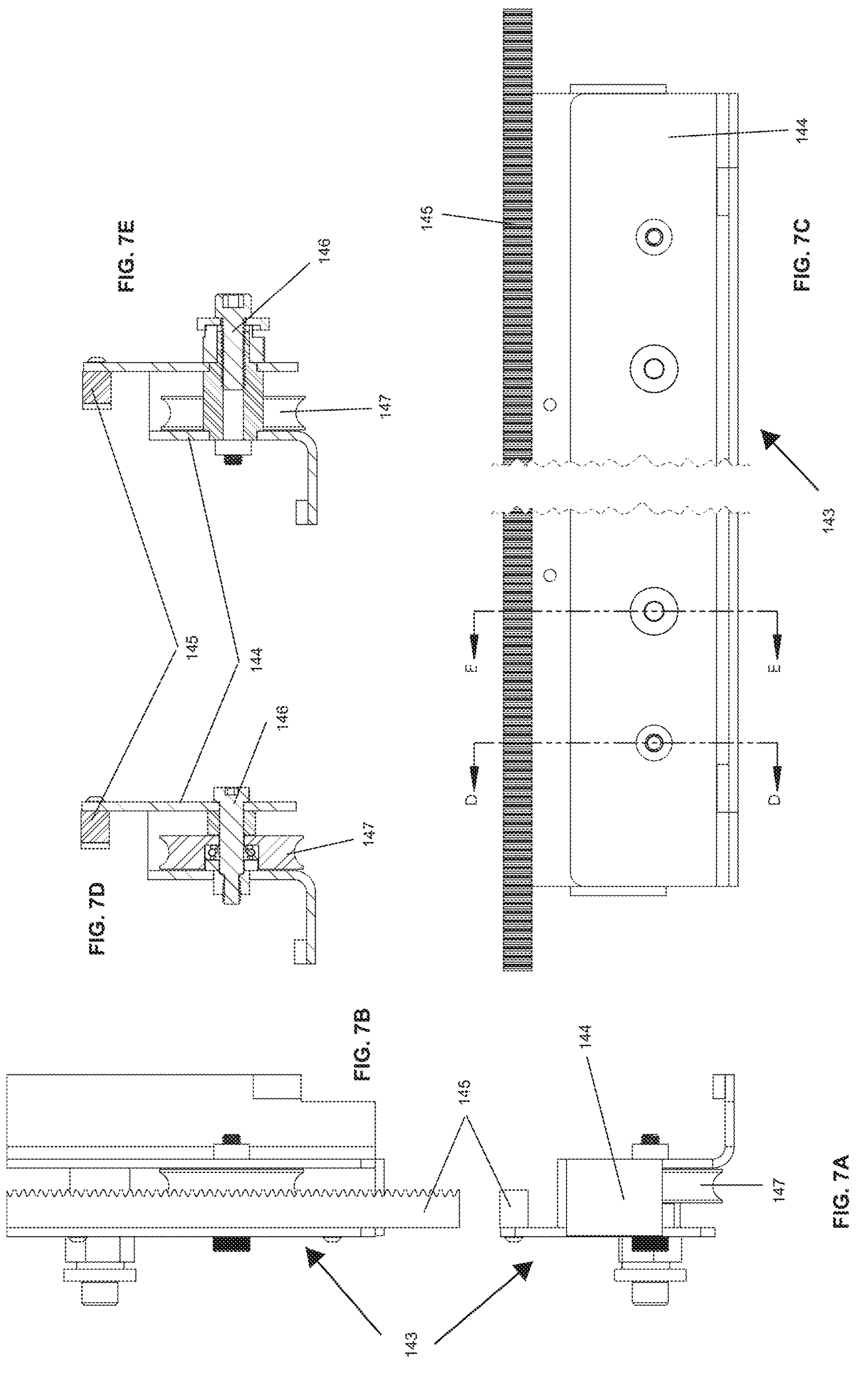

FIGS. 7A, 7B, and 7C depict side, top, and front views, respectively, of an example embodiment of a carriage assembly according to certain embodiments.

FIGS. 7D and 7E depict cross-sectional views of the carriage assembly taken along the D-D and E-E planes, respectively, of FIG. 7C.

Figure 8D:
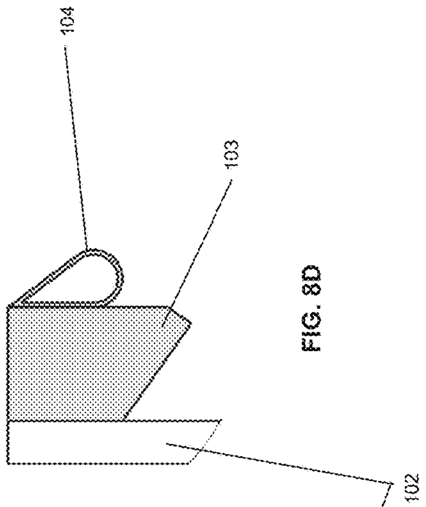
Figure 8C:
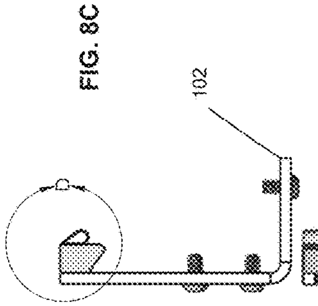
Figure 8B:
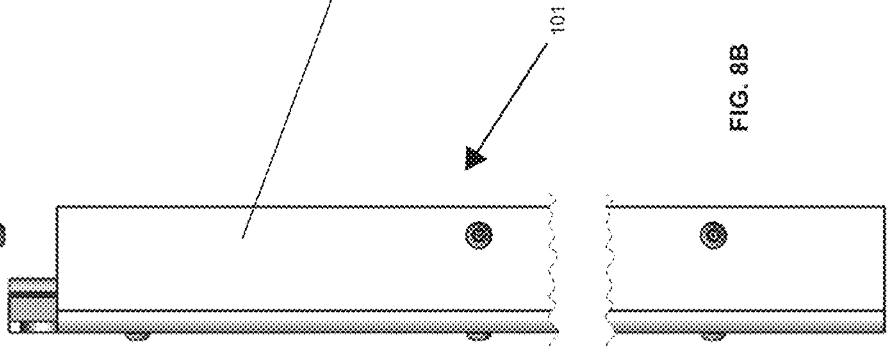
Figure 8A:
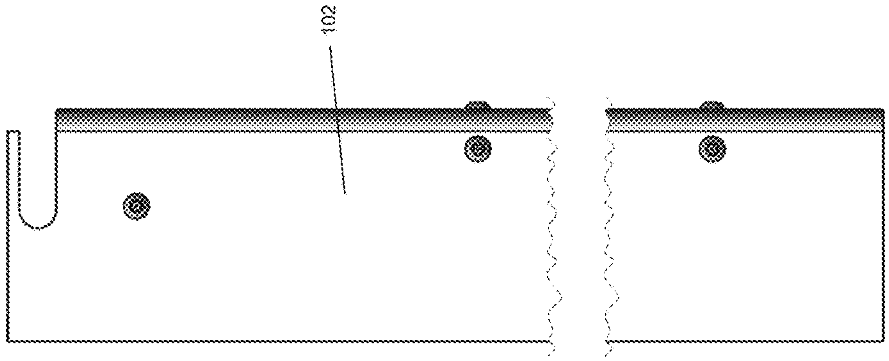

FIGS. 8A, 8B, and 8C depict side, front, and top views, respectively, of an example embodiment of a lateral fire seal assembly according to certain embodiments.

FIG. 8D depicts a partial magnified view of the lateral fire seal assembly taken from FIG. 8B.

Figure 9:
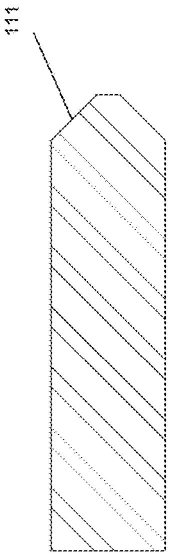

FIG. 9 depicts a cross-sectional view of an example embodiment of a door seal plate according to certain embodiments.

Figure 10C:
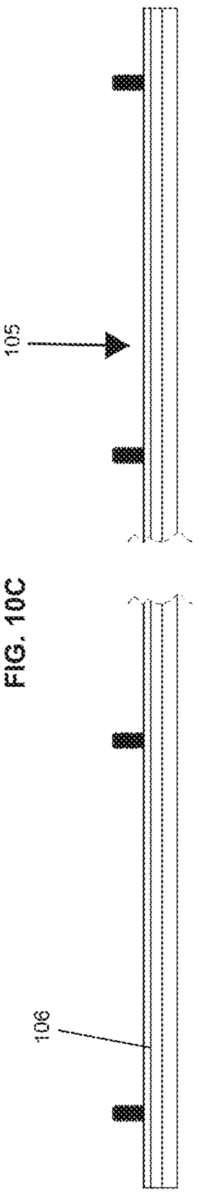
Figure 10A:
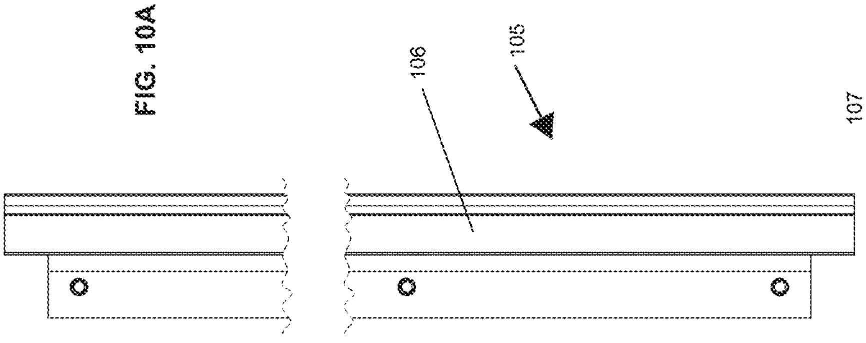
Figure 10B:
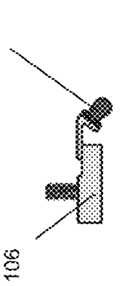

FIGS. 10A, 10B and 10C depict top, side, and front views, respectively, of an example embodiment of an upper fire seal assembly according to certain embodiments.

Figures 11A, 11B, 11C, 11D, 11E, 11F, 11G, 12A, 12B:
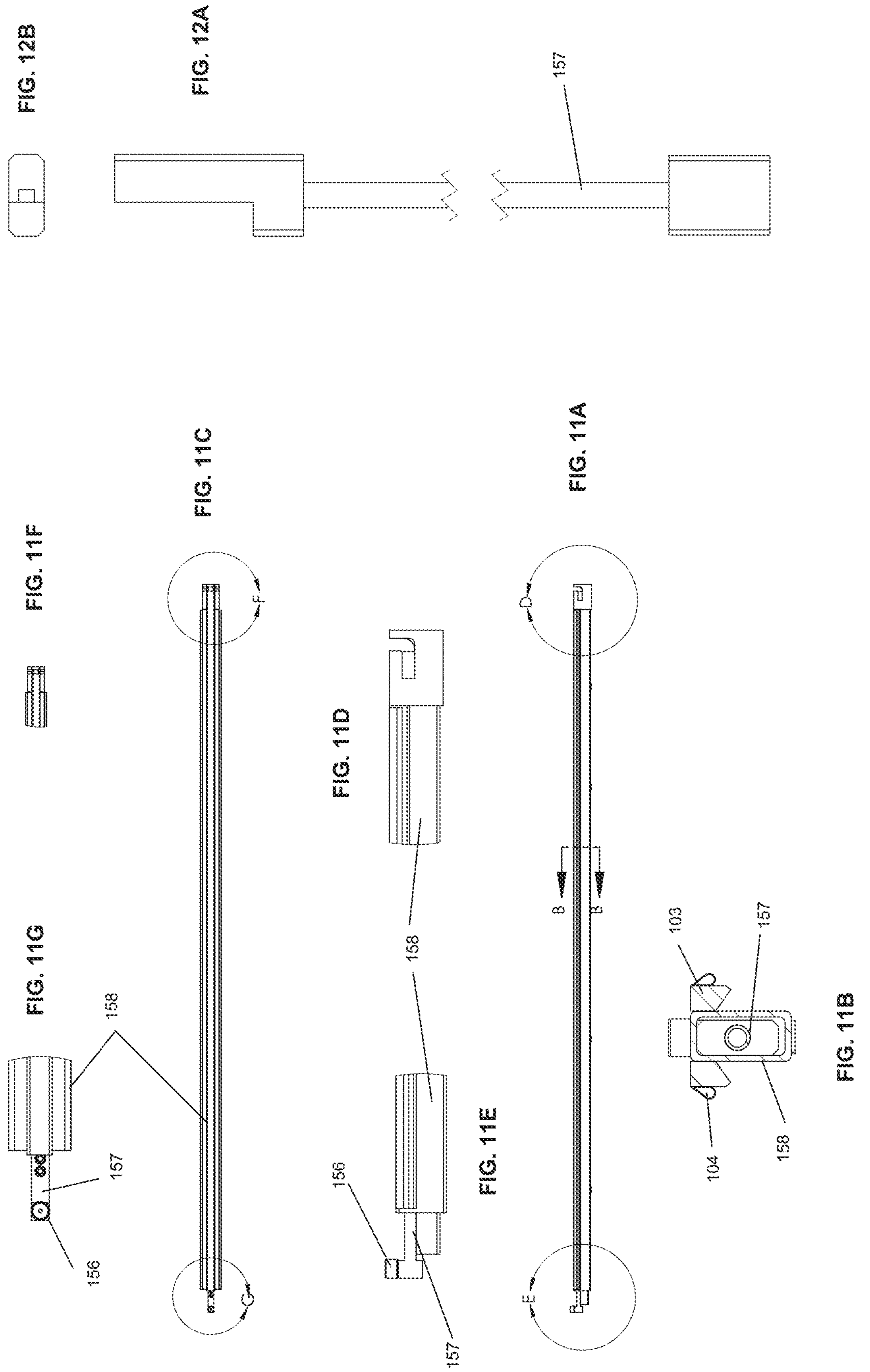

FIGS. 11A and 11C depict side and front views, respectively, of an example embodiment of a locking follower, locking bar, and locking housing of a locking assembly according to certain embodiments.

FIG. 11B depicts a cross-sectional view of the locking assembly taken along the B-B plane of FIG. 11A.

FIGS. 11D, 11E, 11F, and 11G depict partial magnified views of the locking assembly taken from FIGS. 11A and 11C.

FIGS. 12A and 12B depict side and top views, respectively, of an example embodiment of a locking bar according to certain embodiments.

Figures 13A, 13B, 13C, 14A, 14B:
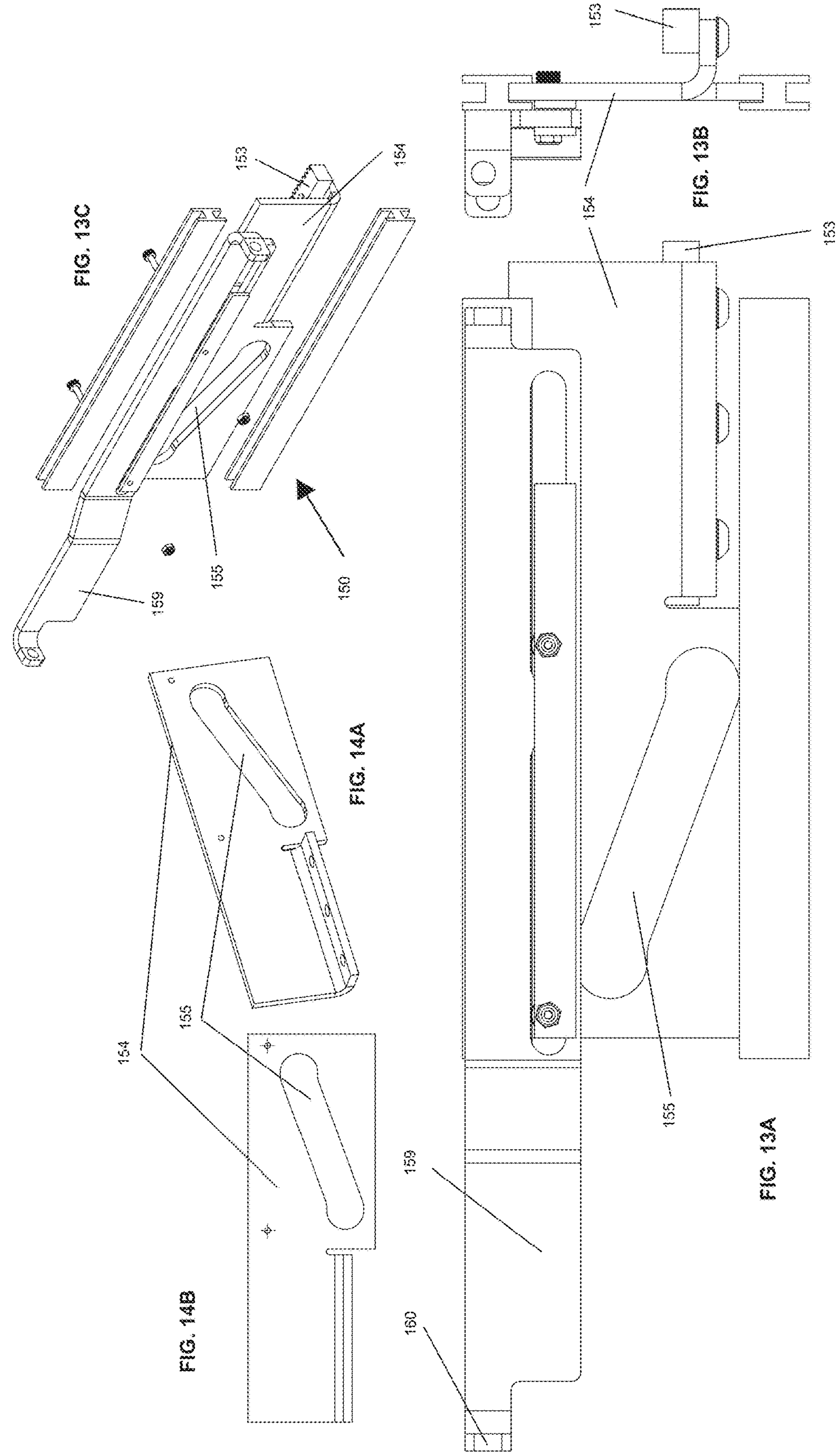

FIGS. 13A, 13B, and 13C depict front, side, and perspective views, respectively, of an example embodiment of a locking assembly according to certain embodiments.

FIGS. 14A and 14B depict perspective and front views, respectively, of an example embodiment of a locking plate according to certain embodiments.

Figure 15A:
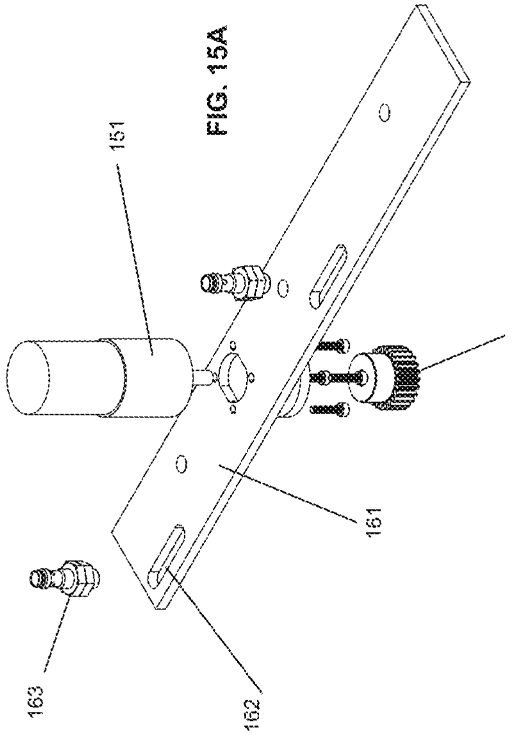
Figure 15B:
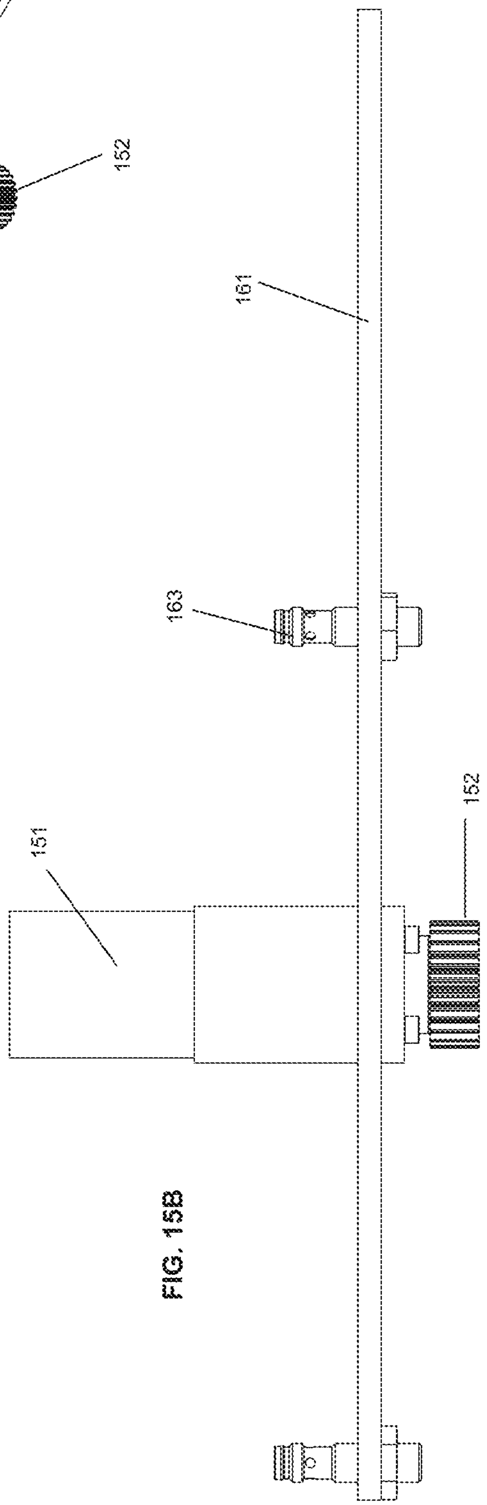
Figure 16D:
Figure 16C:
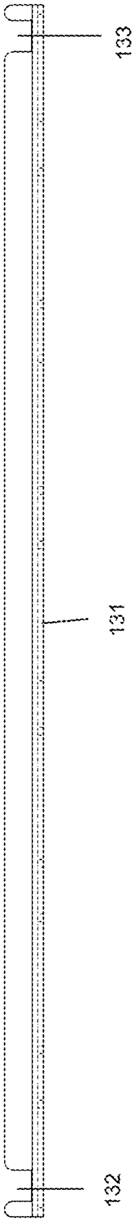
Figure 16B:
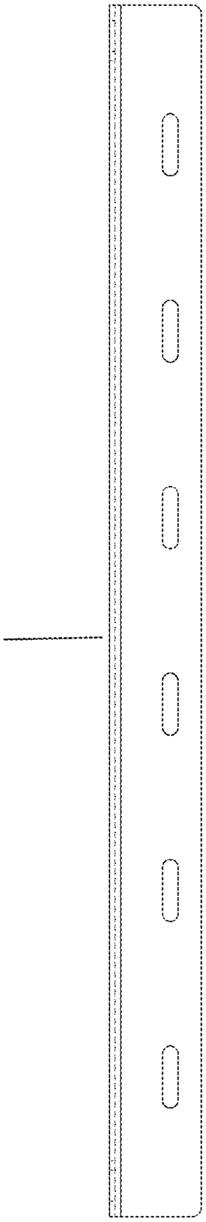
Figure 16A:
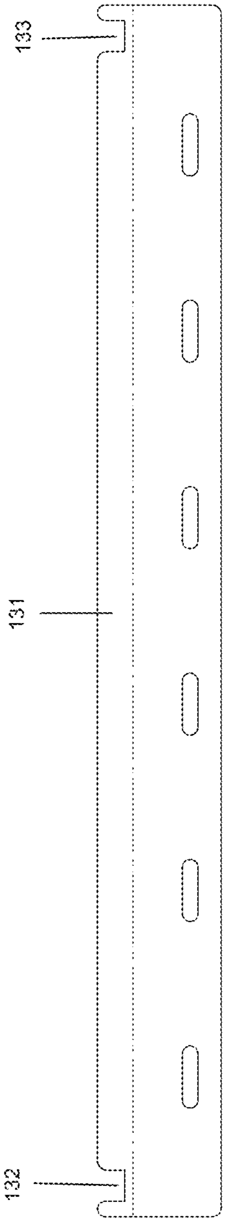

FIGS. 15A and 15B depict exploded perspective and bottom views, respectively, of an example embodiment of a locking effector, locking effector mounting plate, sensor slots, and locking sensors according to certain embodiments.

FIGS. 16A, 16B, 16C, and 16D depict back, bottom, perspective, and side views, respectively, of an example embodiment of a lock receiving plate according to certain embodiments.

Figure 17A:
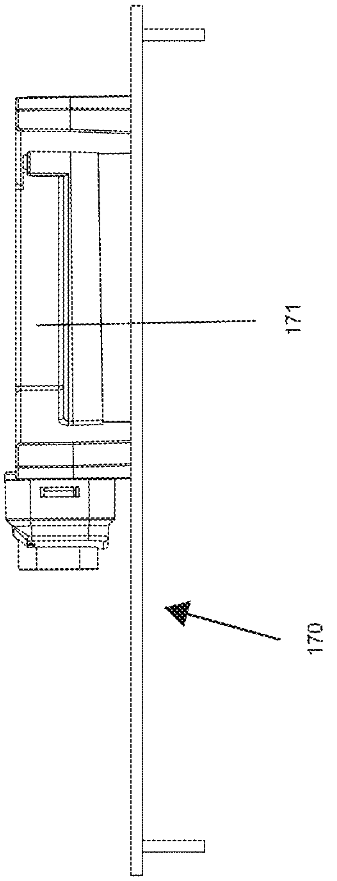
Figure 17B:
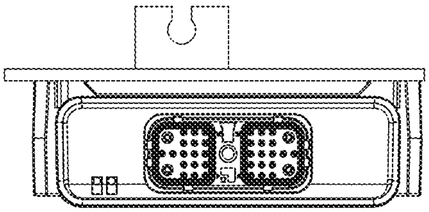

FIGS. 17A and 17B depict side and top views, respectively, of an example embodiment of a control assembly according to certain embodiments.

It should be understood that for clarity, not every part is necessarily labeled in every drawing. Lack of labeling should not be interpreted as a lack of disclosure.

DETAILED DESCRIPTION OF THE INVENTION

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

The sliding security door system 100 includes a security door 110 extending between and slidably traveling along an upper track 120 and a lower track 130. A motive assembly 140 and a controller assembly 170 located to the upper track 120 permit controlled movement of the door 110. A locking assembly 150 partially housed in the upper track 120 prevents movement of the door 110.

In certain embodiments, the door 110 in a fire-rated safety door. A door seal plate 111 having a tapered bilaterally symmetrical hexagonal cross-section is mounted to the trailing lateral edge of the door 110. The symmetrical configuration of the door seal plate 111 allows it to be mounted to a left-trailing edge or a right-trailing edge of the door 110. The door seal plate 111 may interact with at least one lateral fire seal assembly 101 extending vertically along at least one lateral edge of the door 110. The lateral fire seal assembly 101 includes a seal plate 102 having an L-shaped cross-section and mounted to the building structure S. A wedge lock 103 having an irregular pentagonal cross-section is connected to one side of the L-upright. A vertical fire seal 104 is connected to the other side of the wedge lock 103 opposite the seal plate 102. Interaction between the door seal plate 111 and the lateral fire seal assembly 101 provides increased strength to the lateral fire seal assembly 101 and prevents blowout during testing or an emergency situation.

The door 110 may also interact with at least one upper fire seal assembly 106 extending horizontally along at least one upper edge of the door 110. The upper fire seal assembly 106 includes at least one horizontal fire seal 108 connected to a mount bar 107 attached to the building structure S.

The motive assembly 140 includes a carriage assembly 143, featuring a carriage 144 secured to an upper edge of the door 110, and driven by carriage gear drive 142 operably connected to a carriage effector 141. The carriage effector 141 is a bidirectional effector, allowing movement of the door 110 in either direction. In certain embodiments, the carriage effector 141 is an electric motor. In other embodiments, the carriage effector 141 is a pneumatic or hydraulic motor or cylinder, or a linear electric actuator. Such embodiments may not require the carriage gear drive 142.

The carriage gear drive 142 is operably connected to a carriage rack 145 of the carriage assembly 143 using, by way of non-limiting example, a rack-and-pinion connection. The carriage effector 141 drives movement of the carriage gear drive 142, which in turn moves the carriage rack 145 and associated carriage 144 in parallel to the upper track 120. At least one wheel assembly 146 of the carriage assembly 143 includes wheels 147 which travel along a guide rod 121 in the upper track 120 during movement of the door 110.

In certain embodiments, the wheels 147 are manufactured from a material softer than a material of the guide rod 121 such as, but not limited to, a mild steel wheel 147 for use with a stainless steel guide rod 121. In such an embodiment, the wheel 147 has a Rockwell Hardness of 60 while the guide rod 121 has a Rockwell Hardness of 100. Such a material selection prevents wear on the difficult-to-replace guide rod 121. In certain embodiments, the wheels 147 have concave outer surfaces which conform to a convex outer surface of the guide rod 121.

The upper track 120 also houses a carriage sensor 148 operably coupled to the carriage assembly 143 and capable of tracking the motion of the carriage assembly 143. In certain embodiments, the carriage sensor 148 is a linear draw-wire encoder. The carriage sensor 148 transmits data to the controller assembly 170. Overrun of the carriage assembly 143 is prevented by means of upper track stops 122_a_ and 122_b_ located at the first and second ends of the upper track 120. Such stops 122_a_ and 122_b_ may be welded or bolted in place in the upper track 120.

The upper track 120 also houses at least part of the locking assembly 150. The locking assembly 150 includes a locking effector 151 connected by a locking gear drive 152 to a locking rack 153, which is in turn connected to a locking plate 154. The locking effector 151 is a bidirectional effector, allowing movement of the locking rack 153 in either direction. In certain embodiments, the locking effector 151 is an electric motor. In other embodiments, the locking effector 151 is a pneumatic or hydraulic motor or cylinder, or a linear electric actuator. Such embodiments may not require the locking gear drive 152. The locking effector 151 may be activated separately and independently from the carriage effector 141.

The locking effector 151 is operably connected to the locking rack 153 using, by way of non-limiting example, a rack-and-pinion connection. The locking effector 151 drives movement of the locking gear drive 152, which in turn moves the locking rack 153 and associated locking plate 154 in parallel to the upper track 120. The locking plate 154 includes a cam slot 155 angled such that the sliding movement of locking plate 154 causes a locking follower 156 to rise or descend, depending on the direction of motion of the locking plate 154. The locking follower 156 may be a roller or slider follower. Because the locking follower 156 is connected to the locking bar 157, motion of the locking plate 154 also causes the locking bar 157 to rise and descend. The locking bar 157 interacts with a locked-open notch 132 and a locked-closed notch 133 in lock receiving plate 131 mounted to the door 110, such that raising the locking bar 157 from either notch allows the door 110 to move, while lowering the locking bar 157 into either notch locks the door 110 in place.

In various embodiments, the locking bar 157 may be made of hollow pipe or solid bar stock. In certain embodiments, the upper and lower ends of the locking bar 157 are formed to provide clearance around an inside surface of a locking housing 158 extending between the upper track 120 and the lock receiving plate 131. The locking bar 157 extends through the locking housing 158 which prevents tampering with the locking bar 157. Additional wedge locks 103 and vertical fire seals 104 may be mounted to either side of the locking housing 158.

A manual release pull bar 159 is connected to the locking plate 154, allowing a user to manually disengage the locking bar 157 by pulling a manual release cable 160 attached to the manual release pull bar 159.

The locking effector 151 is mounted to a locking effector mounting plate 161 which connects the locking effector 151 to the upper track 120. The locking effector mounting plate 161 also includes at least two sensor slots 162 for mounting locking sensors 163. In certain embodiments, the locking sensors 163 are microswitches triggered by movement of the locking rack 153.

The upper track 120 also houses the controller assembly 170. The controller assembly 170 includes a programmable controller 171 having hardwired connections to the carriage effector 141, the carriage sensor 148, a remote control station, the locking sensors 163, and a locking effector 151. The programmable controller 171 can receive door-state commands from the remote control station and is programmed with two set-points which are numerical values representing two positions of the carriage assembly 143. These two set-points represent positions corresponding to locked-closed and locked-open states of the door 110. The programmable controller 171 can receive and transmit sensor data from the carriage sensor 148 and the locking sensors 163, and transmit control signals to the carriage effector 141 and the locking effector 151.

In one embodiment, the programmable controller 171 is configured with an emergency release or safety mode. When an emergency signal is received from the remote control station, the programmable controller 171 activates the locking effector 151 to raise the locking bar 157 from the locked-closed notch 133. Upon the carriage sensor 148 sensing motion of the carriage 144 from a user manually opening the door 110 below a threshold value of force, the carriage sensor 148 transmits sensor data to the programmable controller 171. In certain embodiments, the threshold is seven pounds of force. In response, the programmable controller 171 activates the carriage effector 141 to fully open the door 110. After a predetermined period of time, the programmable controller 171 activates the carriage effector 141 to fully close the door 110. Locking effector 151 is still in emergency mode and does not allow for the door 110 to lock. The emergency mode must be able to provide for closing a minimum of fifty (50) times, then activates the locking effector 151 to drop the locking bar 157 into the locked-closed notch 133.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and/or method steps described herein may be used alone or in combination with other configurations, systems and/or method steps. It is to be expected that various equivalents, alternatives and modifications are possible within the scope of the foregoing description.

What is claimed is:

1. A sliding security door system comprising:

a door extending between an upper track and a lower track;

a motive assembly located in the upper track for driving a carriage assembly connected to the door, wherein the motive assembly comprises a motive effector operably connected to a rack connected to a carriage;

a locking assembly at least partially located in the upper track for preventing movement of the door, wherein the locking assembly comprises a locking effector operably connected to a locking bar;

a control assembly operably connected to the motive assembly and the locking assembly, wherein the control assembly is capable of separately activating the motive effector and the locking effector; and a lateral fire seal assembly comprising a seal plate connected to a wedge lock, wherein at least one vertical fire seal is connected to the wedge lock opposite the seal plate.

2. The system of claim 1, further comprising an upper fire seal assembly comprising a horizontal fire seal connected to a mount bar.

3. The system of claim 1, further comprising a door seal plate having a tapered bilaterally symmetrical cross-section mounted to a trailing lateral edge of the door.

4. The system of claim 1, further comprising a plurality of upper track stops located at a first end and a second end of the upper track.

5. The system of claim 1, wherein the motive effector is operably connected to the rack by a carriage gear drive.

6. The system of claim 1, wherein the carriage assembly further comprises at least one wheel assembly connected to the carriage for interacting with a guide rod mounted in the upper track.

7. The system of claim 6, wherein a wheel of the wheel assembly comprises a first material softer than a second material forming the guide rod.

8. The system of claim 1, wherein the carriage assembly further comprises a carriage sensor operably coupled to the carriage assembly and transmitting sensor data to the control assembly.

9. The system of claim 1, further comprising a lock receiving plate mounted to the door, the lock receiving plate having a locked-open notch for receiving the locking bar in an unlocked configuration and a locked-closed notch for receiving the locking bar in a locked configuration.

10. The system of claim 1, further comprising a locking housing extending between the upper track and the lower track, wherein the locking bar slidably extends through and parallel to the locking housing.

11. The system of claim 1, wherein the locking effector is connected to the upper track by a locking effector mounting plate.

12. The system of claim 11, wherein the locking effector mounting plate comprises a plurality of sensor slots, wherein a locking sensor is located in each of the plurality of sensor slots for sensing the position of a locking rack and transmitting sensor data to the control assembly.

13. The system of claim 1, wherein the motive effector and the locking effector are selected from the group consisting of: an electric motor, a pneumatic or hydraulic motor or cylinder, a linear electric actuator, and any combination thereof.

14. The system of claim 1, wherein the motive effector and the locking effector are bidirectional effectors.

15. A sliding security door system comprising:

a door extending between an upper track and a lower track;

a motive assembly located in the upper track for driving a carriage assembly connected to the door, wherein the motive assembly comprises a motive effector operably connected to a rack connected to a carriage;

a locking assembly at least partially located in the upper track for preventing movement of the door, wherein the locking assembly comprises a locking effector operably connected to a locking bar; and a control assembly operably connected to the motive assembly and the locking assembly, wherein the control assembly is capable of separately activating the motive effector and the locking effector, wherein the locking effector is connected to the locking bar by a locking plate having an angled cam slot, and the locking bar is connected to a locking follower traveling along the cam slot as the locking plate moves parallel to the upper track; and a manual release pull bar interconnecting the locking plate and a manual release cable.

16. The system of claim 15, wherein the cam slot is angled such that a sliding movement of the locking plate in a first direction causes the locking follower to rise and a sliding movement of the locking plate in a second direction opposite the first direction causes the locking follower to descend.

17. A sliding security door system comprising:

a door extending between an upper track and a lower track;

a motive assembly located in the upper track for driving a carriage assembly connected to the door, wherein the motive assembly comprises a motive effector operably connected to a rack connected to a carriage;

a locking assembly at least partially located in the upper track for preventing movement of the door, wherein the locking assembly comprises a locking effector operably connected to a locking bar; and a control assembly operably connected to the motive assembly and the locking assembly, wherein the control assembly is capable of separately activating the motive effector and the locking effector, wherein the locking effector is connected to the locking bar by a locking plate having an angled cam slot, and the locking bar is connected to a locking follower traveling along the cam slot as the locking plate moves parallel to the upper track, and further wherein the locking effector is connected to the locking plate by a locking rack.

18. The system of claim 17, wherein the locking effector is connected to the locking rack by a locking gear drive.

* * * * *